United States Patent [19]

Vere et al.

[11] Patent Number: 4,680,443

[45] Date of Patent: Jul. 14, 1987

[54] PROCESS AND APPARATUS FOR ELECTRON BEAM WELDING GRIDS FOR A NUCLEAR FUEL ASSEMBLY

[75] Inventors: Bernard Vere, Eybens; Paul Mathevon, Bollene, both of France

[73] Assignee: Cogema, Framatome et Uranium Pechiney, France

[21] Appl. No.: 710,685

[22] Filed: Mar. 12, 1985

[30] Foreign Application Priority Data

Mar. 13, 1984 [FR] France ................. 84 03839

[51] Int. Cl.[4] ............................................. B23K 9/00
[52] U.S. Cl. ........................ 219/121 ED; 219/121 LD; 219/121 EL; 219/121 EX; 219/158; 228/181
[58] Field of Search ................. 219/121 EB, 121 EM, 219/121 EC, 121 ED, 121 EU, 121 EX, 121 EY, 137 R, 158, 160, 121 EL; 228/181

[56] References Cited

U.S. PATENT DOCUMENTS 3,406,752  10/1968  Lion ........................... 219/121 ED
3,617,685  11/1971  Edwards ..................... 219/121 ED
4,054,772  10/1977  Lichte ......................... 219/121 EX
4,074,104   2/1978  Fulkerson ................... 219/121 EX

OTHER PUBLICATIONS

"Fabrication of Grid Spacer Assemblies for Liquid Metal Fast Breeder Reactors", Nuclear Technology, vol. 52, Mar. 1981, Jones et al.

*Primary Examiner*—M. H. Paschall
*Attorney, Agent, or Firm*—Larson and Taylor

[57] ABSTRACT

The apparatus is for welding grids, particularly for a nuclear fuel assembly, constituted by two sets of strips at right angles and whose terminal portions are made fast to a belt. It comprises, in an enclosure with a controlled atmosphere provided with a lock, a double cross movement table bearing at least one orientation device and which is capable of bringing each surface and each side of the grid in its turn into an orientation perpendicular to the firing line of a radiation welding member and to move the frame in two directions perpendicular to the firing line, so as to bring each spot to be welded in its turn opposite the firing line. The orientation device and the table are provided with control motors and constitute an automation for presenting all the weld spots to be formed successively opposite the firing line.

11 Claims, 20 Drawing Figures

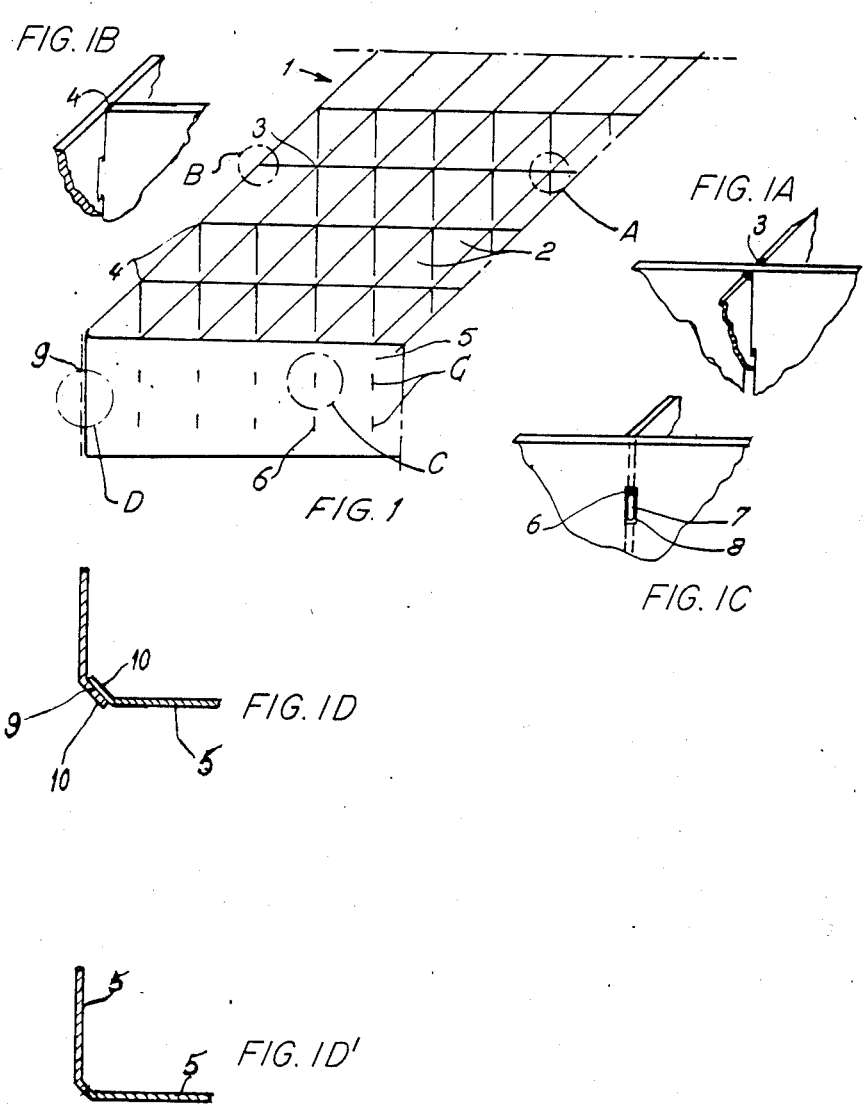

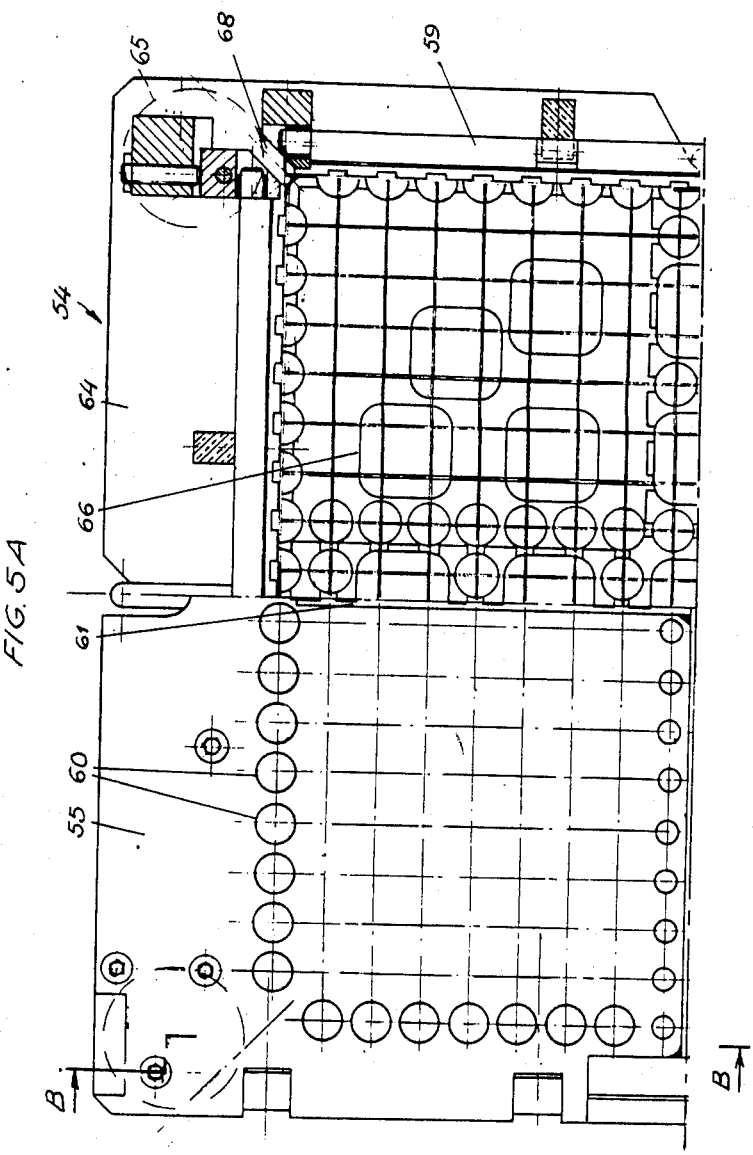

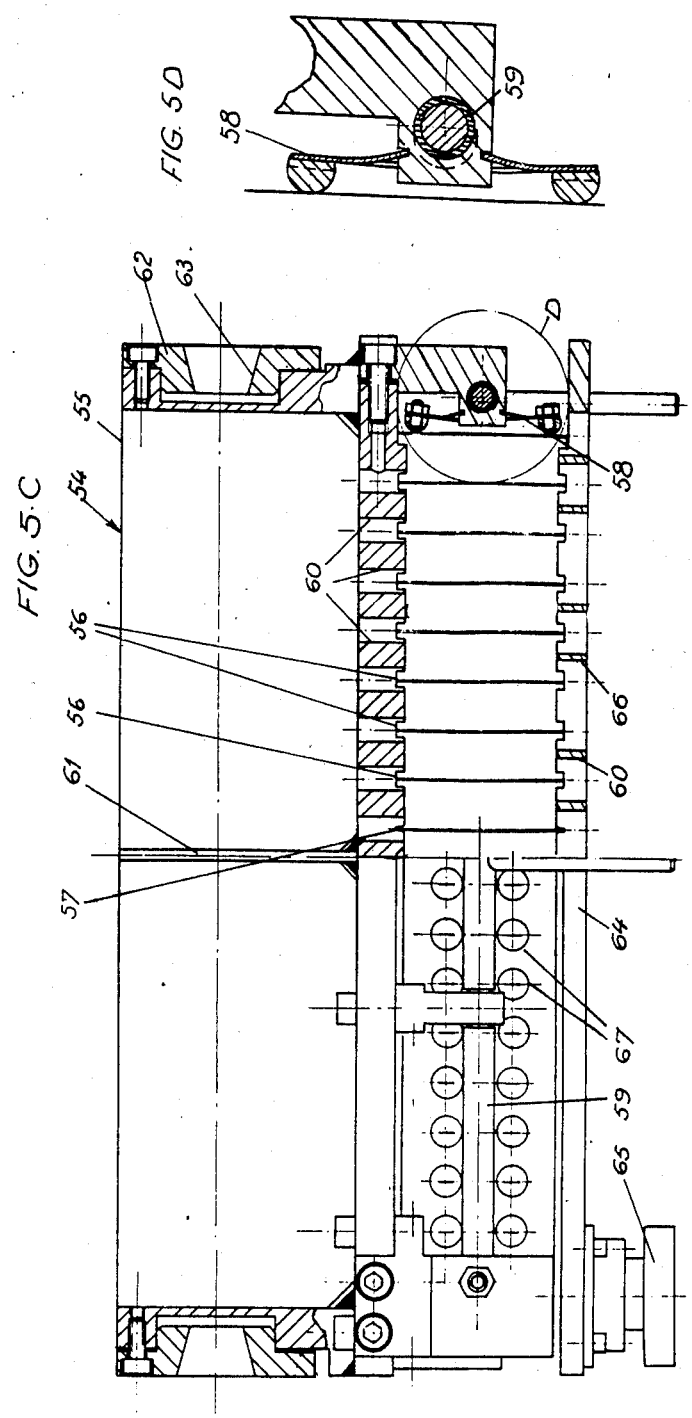

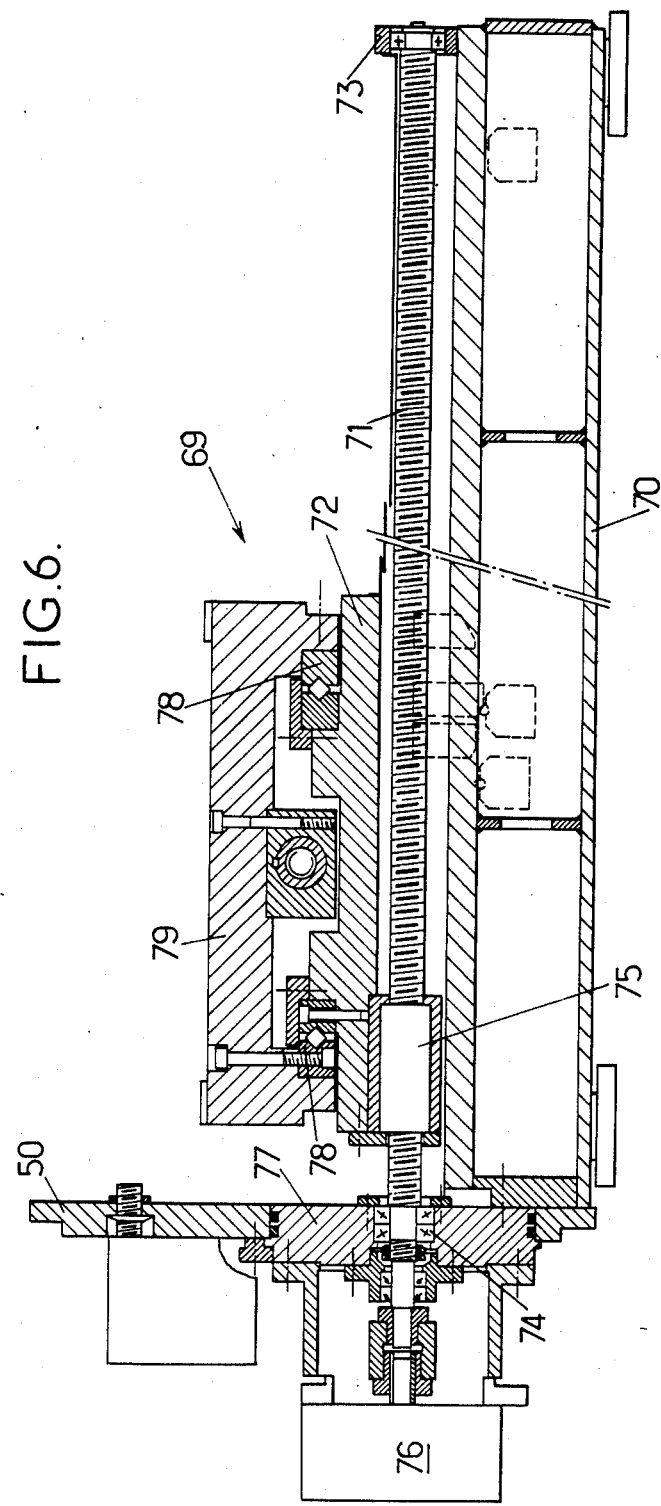

PROCESS AND APPARATUS FOR ELECTRON BEAM WELDING GRIDS FOR A NUCLEAR FUEL ASSEMBLY

BACKGROUND OF THE INVENTION

The invention relates to the manufacture of grids for use in nuclear reactor fuel assemblies. It is particularly suitable for the manufacture of grids for assemblies whose framework comprises end pieces joined by tie-rods in some of the recesses of grids distributed regularly along tie-rods, the other recesses of the grids supporting the fuel elements of the assembly.

The grids generally comprise two sets of strips arranged in two directions at right angles and assembled in half-iron manner in order to define elementary cells traversed by the fuel elements and the tie-rods. The strips are in addition joined, at their periphery, to a belt having the same cross section as the strips. To ensure the cohesion of the grids, the parts are mutually secured at their intersections. This operation is often carried out at the present time by manual brazing, that is to say by a long and tedious process which, moreover, does not guaranty entirely satisfactory reproducibility, even if a positioning jig is used, such as that described in U.S. Pat. No. 4,111,348, for construction of grids whose strips have cut out portions which constitute support springs for the fuel elements, or described in French Pat. No. 2,364,729.

SUMMARY OF THE INVENTION

It is an object of the invention to provide an improved method and apparatus for welding the various parts of a grid, suitable for use in grids having stamped springs or separate springs; it is a more specific object to carry out in sequence and automatically all welds necessary under conditions ensuring the support of the parts and the absence of deformations.

Accordingly, the invention provides a method of welding grids constituted by two sets of strips arranged at right angles and whose end portions are bound by a belt, wherein the grid is placed in a frame for shaping and mechanically holding the latter having access passages to the spots to be welded on the two surfaces and on the sides of the grid; the frame containing the grid is seized by means of a swivelling device borne by a cross motion table movable in two directions perpendicular to the firing line of a radiation welding member; the grid is travelled by means of the table, passes each spot to be welded on one surface across the firing line of the welding means which is energized when confronting the spot; the travel and energization operations are repeated after tiltings of 90° around a first axis perpendicular to the firing line by means of the swivelling device, in order to effect welds on the whole of the two surfaces and on both sides; the travel and welding operations are repeated after having brought the frame into two opposite orientations by tilting around a second axis at right angles to the first, in order to produce welds on the two last sides, before setting down the frame.

The welding member is typically an electron beam generator, the welding then being done under vacuum. The welding is carried out while the grid is in motion, which avoids jerks and increases the operating rate. Focussing and deflection means with which the electron beam generators used for the welding are generally provided, may be employed to enlarge the focal spot to "follow" frame, enabling a longer welding time to be available for each spot.

The method may also be used to produce welds in the corners of the belt, after tilting the frame into directions around the second axis at 45° from those used to produce the welds on the size.

The invention also provides a grid welding apparatus comprising, in a vessel with a controlled atmosphere provided with a lock, a cross-motion table bearing at least one swivelling device and which is capable of bringing each surface and each side of the grid in turn into a direction perpendicular to the firing line of a radiation welding member and of moving the frame in two directions perpendicular to the firing line, so as to bring each spot to be welded in turn opposite the firing line.

The invention will be better understood from the following description of a particular embodiment, given by way of example only. The description refers to the accompanying drawings.

SHORT DESCRIPTION OF THE DRAWINGS

FIGS. 1–1D' are perspective diagrammatic views of a fraction of a grid to which the invention is applicable.

Each of FIGS. 1A, 1B, 1C, 1D and 1D' are detailed views of portions of FIG. 1, showing different types of welds.

Figure 2A:
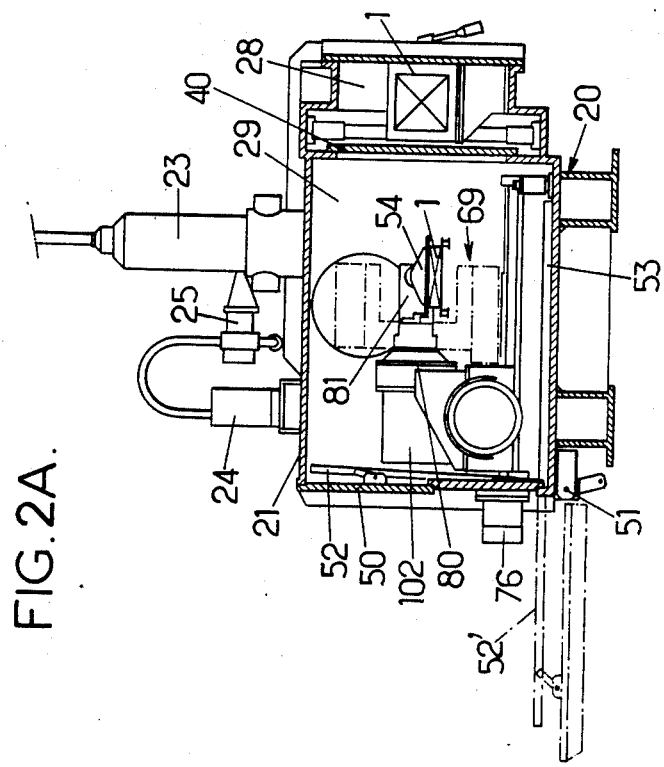
FIG. 2A is a view in elevation and in partial vertical section of an apparatus according to a particular embodiment of the invention.
Figure 2B:
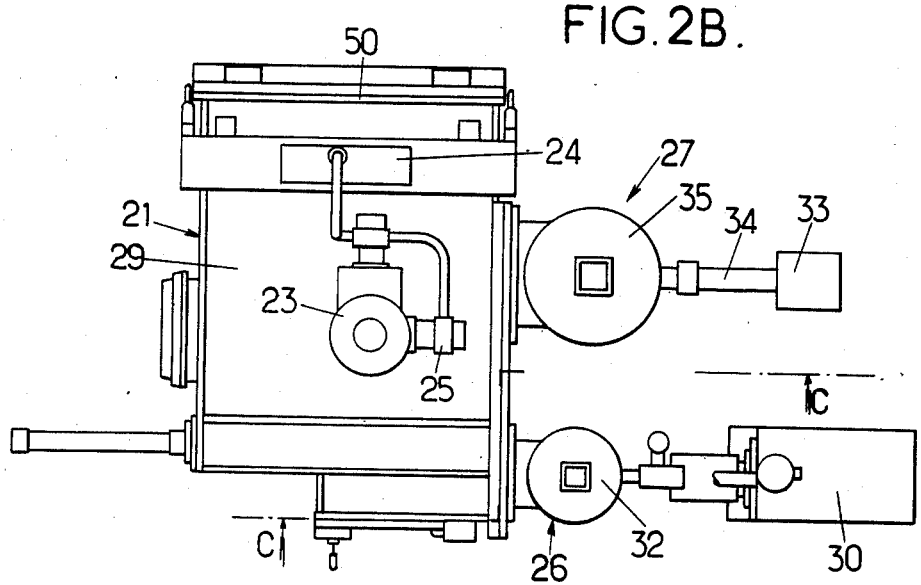
FIG. 2B is an overhead view of FIG. 2A.
Figure 2C:
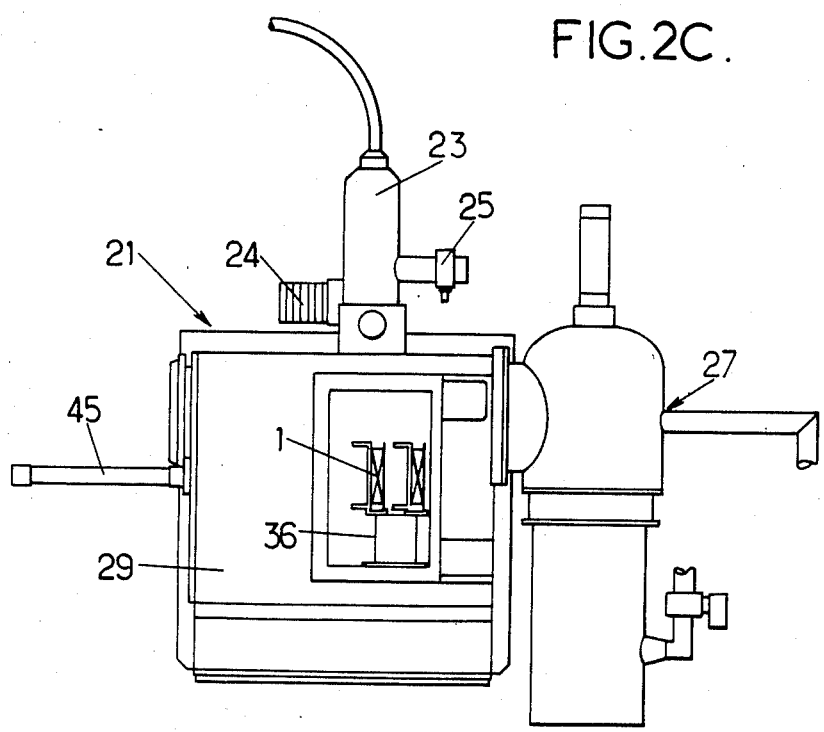
Figure 3:
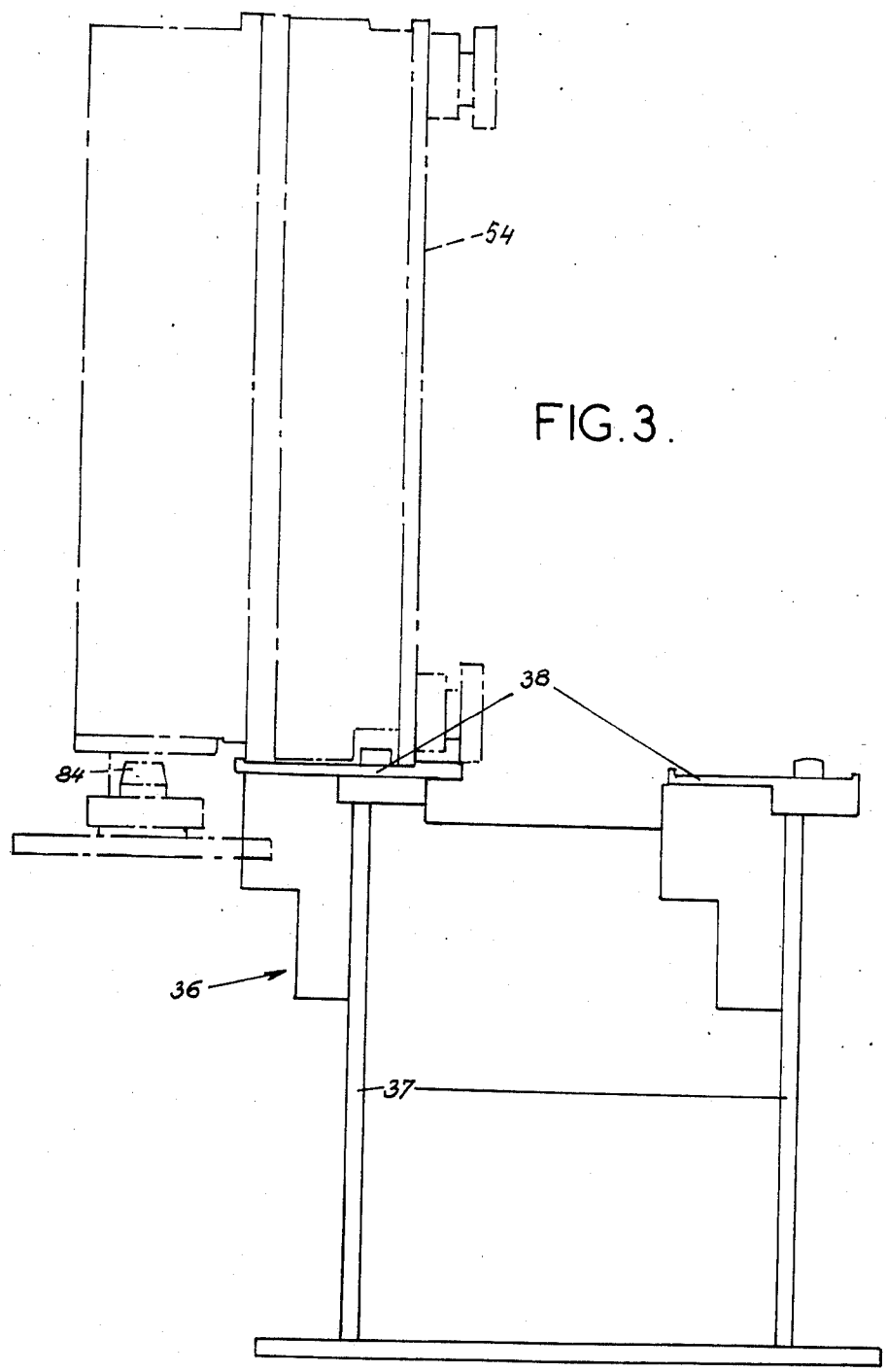
Figure 4A:
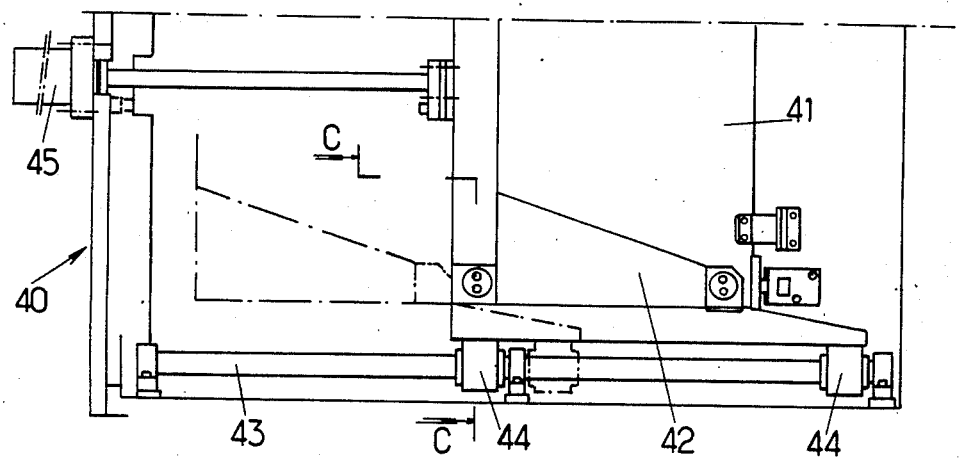
Figure 4B:
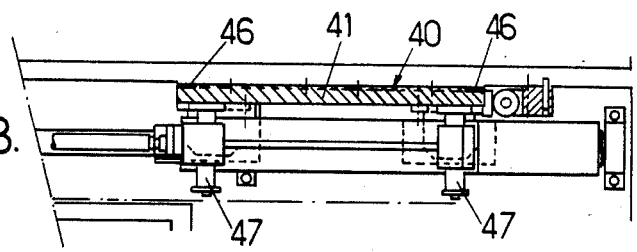
Figure 4C:
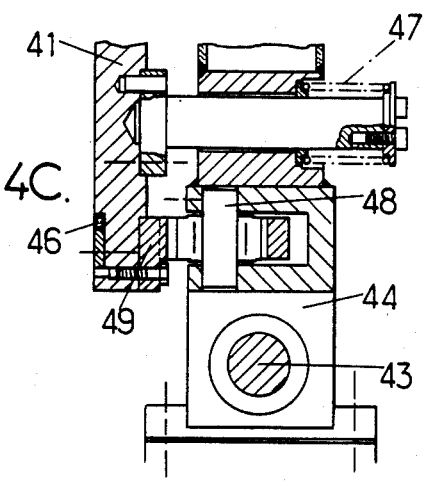
Figure 5B:
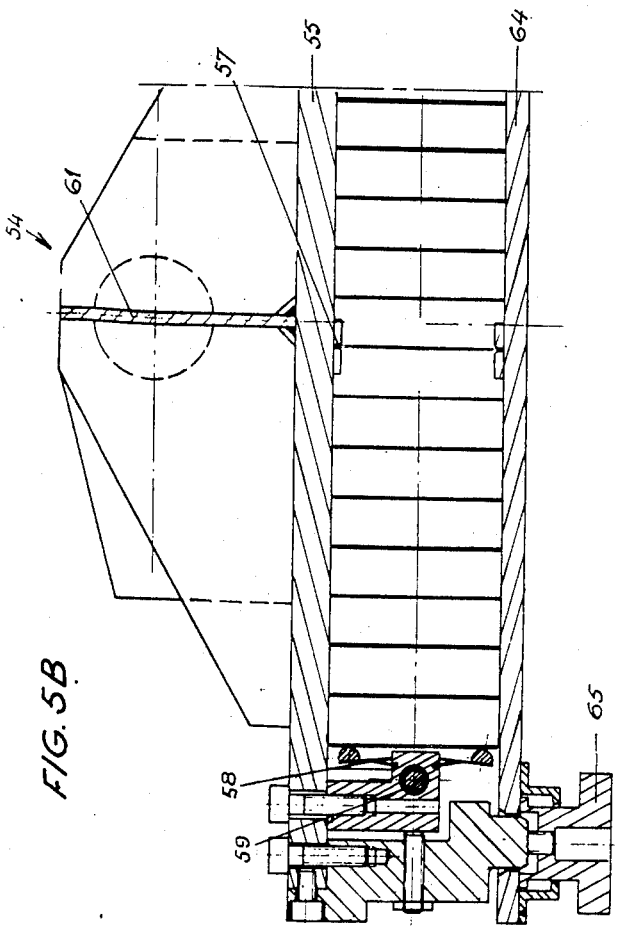
Figure 7:
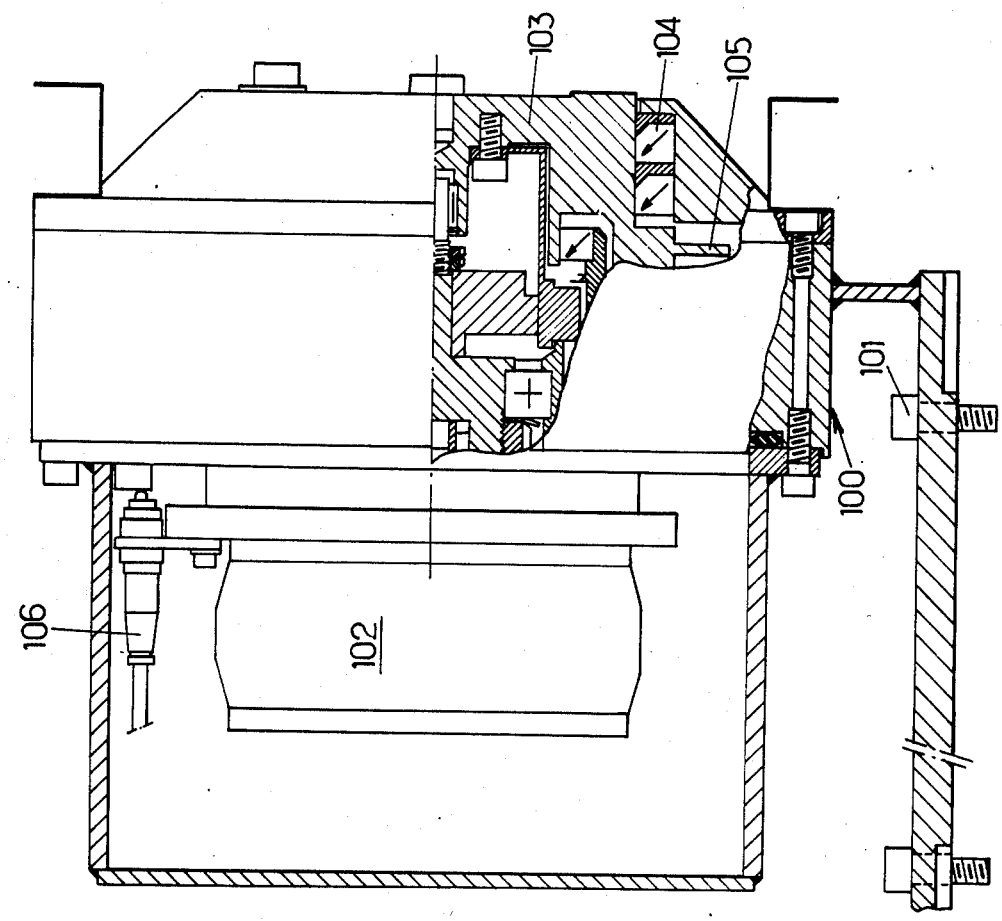
Figure 8:
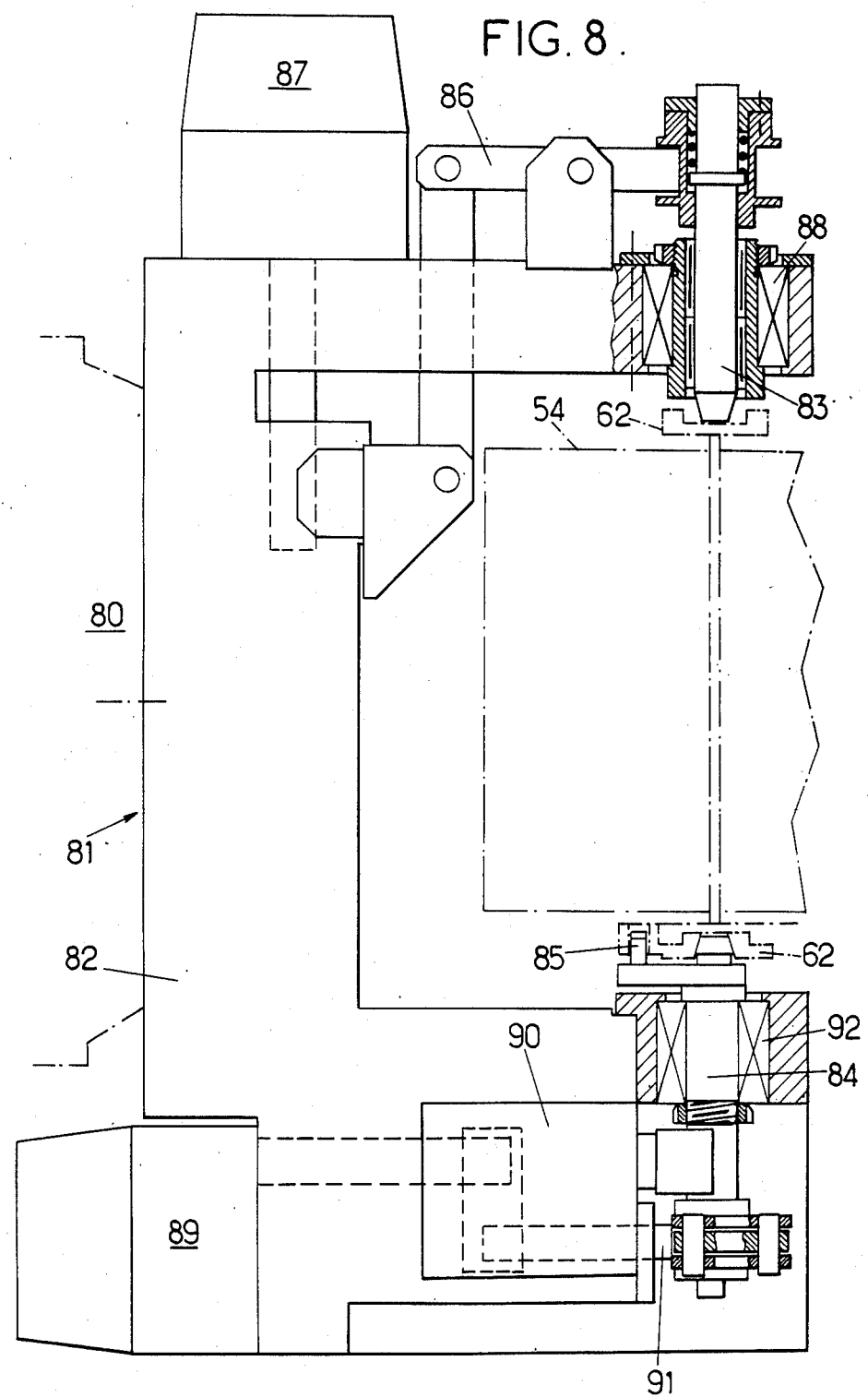

FIG. 2C is a view in elevation of the apparatus seen from the right of FIG. 2A and as indicated by line C—C in FIG. 2B, the door of the lock being open, FIG. 3 is a diagrammatic view, in section along a vertical plane, of a grid support placed in the lock, FIG. 4A is a view in elevation of the separating door between the lock and the welding chamber of the apparatus of FIGS. 2A–2C, the upper portion not being shown, FIG. 4B is an overhead view, in partial section, of the door of FIG. 4A, FIG. 4C is a detailed view in section along line C—C of FIG. A, FIG. 5A shows one half of a grid support frame which can be used in the apparatus according to the invention, the left hand and the right hand parts of the Figure showing the frame respectively as seen from the base plate side and from the removable plate side, certain portions being in section, FIG. 5B is a sectional view along the line B—B of FIG. 5A, FIG. 5C is a view in half elevation and half section along a plane perpendicular to those of FIGS. 5A and 5B, FIG. 5D is a view on an enlarged scale of the detail shown in the circle D of FIG. 5C, FIG. 6 is a sectional view along a plane parallel to that of FIG. 2A, showing the double cross motion table of the installation, FIG. 7 is a simplified view in elevation, partly in section, showing the headstock borne by the table of FIG. 6, FIG. 8 is a simplified view, in elevation and in partial section, showing the frame engagement unit of the swivelling device.

DETAILED DESCRIPTION OF A PREFERRED EMBODIMENT

The installation which will be described by way of example is suitable for mutually welding the parts of a grid of the type shown in FIG. 1, which grid may be as described in French Pat. No. 2,474,229. Grid 1 comprises two sets of elementary strips 2 positioned at right angles and assembled in half-iron relationship. A bounding weld 3, which will be called below "type A weld" illustrated in detail at A in FIG. 1 and in FIG. 1A, connects the strips at each intersection, on each of the two larger surfaces of the grid 1. The edges of the strips 2 form with the peripheral strips 5 constituting the belt, a T shaped intersection which receives, on each surface, a weld 4 which will be called "type B" below as shown at B in FIG. 1 and in FIG. 1B.

Strips 22 are formed with end lugs 7 which are engaged in slots 8 formed in the strips 5 of the belt. The lugs (some of which can be deformed to produce mechanical locking) are welded to the belt 5 at points distributed along the belt. Such a welding thus on the edge will be called "type C" as shown at C in FIG. 1 and in FIG. 1C.

Finally, welds 9 produced in the form of a bead, complete the bounding of the elements of the grid by joining the folded edge portions 10 formed at the end of the peripheral strips 5. These welds will be called "type D weld" as shown at D in FIG. 1 and in FIG. 1D. The welds D may, for certain types of strips 5, be edge to edge, as also indicated at D in FIG. 1 and as shown in FIG. 1D'.

An apparatus will now be described which enables the numerous weld spots required to be produced satisfactorily, by means of high precision tooling operating in a controlled-atmosphere chamber which avoids pollution which could result in corrosion and detrimentally affect the welding.

In order that the welding of the constituents of the grid may be done whilst they are in correct relation, each assembled grid is set in place in a frame designed to hold the components of the grid in a well determined position and, finally, to constitute a movable unit which can be brought into each and every angular position required for welding. The apparatus which will be described is provided for handling such frames, which will be described below.

The apparatus may be regarded as comprising a fixed structure defining an enclosure provided with a lock and with pumping units, a welding member fixed to the structure and an automatically controlled handling unit placed inside the fixed structure. These various components will be successively described.

Referring to FIGS. 24–2C, the fixed structure 20 2A–2C) comprises an enclosure 21 constructed of a plurality of mutually welded parts, whose lower surface rests on sole plates anchored to the ground. Enclosure 21 is adjacent to an introducing and withdrawal lock 28, separated by a door 40 from the welding chamber 29 defined by the enclosure 21 and separated from the atmosphere by a door provided with a hand-actuated locking and manually opening lever.

The welding chamber 29 and the lock 28, which may have respective capacities of 2 $m^3$ and 0.29 $m^3$ for the use envisaged here, are provided with respective pumping units 27 and 26. The unit 26 can then include a mechanical pump 30, a "ROOTS" pump 31 and a diffusion pump 32 having discharge rates of about 100 $m^3/h$, 3500 $m^3/h$ and 2300 1/sec, respectively.

The unit 27 may include a mechanical pump 33, a "ROOTS" type pump 34 and a diffusion pump 35 respectively having flow rates of about 200 $m^3/h$, 1000 $m^3/h$, 6000 1/sec. The two units 26 and 27 are adapted to evacuate the lock and the welding chamber. In the lock 28 there is placed a grid support stand 36, shown in detail in FIG. 3 (on a larger scale than in FIG. 2C). This support is composed of two pillars 37 spaced apart to define the space necessary for automatically taking up and setting down of the parts. Slides 38, fixed to the upper portion of pillars 37, have a shape corresponding to those of the support frames for the grids. They permit setting down and taking up of the frames by the handling unit. Referring to FIGS. 4A, 4B and 4C, the separating door 40 is constituted by a plate 41, advantageously of steel, connected by brackets 42 to ball bearing bushes 44. The bushes 44 are arranged to move along fixed slides 43. A jack 45 is adapted to move the door between a closed position and a withdrawn position, in which the lock 28 and the welding chamber 29 are in communication, and the automation system described below can come to take up or deposit a frame on the support 36. The door 40 comprises t its periphery bearing surfaces for fluid-tight seals 46. To avoid rapid wear of the seals 46 through friction, pression springs 47, (FIG. 4C) are placed between the bushes and the door and bias the door away from the bearing surfaces of the communicating opening. Thus, movement occurs without friction of the seals on the wall. An axle 48 (FIG. 4C), fast to the bushes 44, cooperates with an inclined ramp 49 connected to the tray 41 and possessing an inclination of about 30%. It forces the door onto the wall to ensure the fluid-tight separation of the two chambers. In operation, the jack 45 moves the door linearly from the open position to the closed position. When the door is arrested by its stops, the jack continues its travel moving the axle 48 along the ramp 49 until the seals 46 are in sealing contact with the bearing surfaces of the wall (FIGS. 2A and 2B).

The rear door 50 is designed to permit maintenance of the automation system. It is hinged on a horizontal tilting axis 51.

On the inner surface of this door 50 are fixed rails 52 which, when the door is open (as indicated in mixed lines in FIG. 2A), come into alignment at 52' with rails 53 for positioning and supporting the programmable unit. Consequently, it is possible to slide the programmable unit on the rails up to the working position and to withdraw it. The welding member 23 is fixed to the ceiling of the enclosure 21. It comprises an electron beam generator provided with a focussing and deflection system, which may be of a currently available type, associated with a high voltage electrical supply provided with control means. It can be indicated, by way of example, that the welding of strips of zirconium-based alloy called "zircaloy" may be carried out under good conditions with a power of 1.5 kW. A high voltage supply of 30 kV may be used for a maximum power of the gun of about 2.3 kW.

The gun may comprise in addition a television camera (not shown) associated with a screen for displaying the weld spots carried out after "firing".

A pumping unit is associated with the generator: in the case illustrated, it is constituted by a mechanical pump 24 associated with two turbomolecular pumps 25 ensuring, respectively, flow rates of about 15 $m^3/h$ and 170 1/sec. A cut-off valve enables the pumping unit to be isolated and prevents the emission of the beam in the case of accidental raise of pressure in the gun of the generator.

It will be seen below that type A and D welds may be made whilst the grid is being moved. Two solutions are then available. The first consists of moving the grid at a sufficiently slow speed for the duration during which the point A or B is within the beam and the latter can be emitted, suffices for an adequate weld. The second consists of using the deflection system of the generator to "track" the points to be welded with the beam. It is then possible to start firing before the weld spot is on the theoretical axis of the beam and to follow it after this axis. This permits, for a predetermined welding current, to increase the speed of movement of the grid. This tracking can be effected with a conventional deflection system comprising deflection coils in two perpendicular directions X and Y associated with an electronic control system. The focussing system can be used for type C welds in order to deform and enlarge the focus spot.

Each support frame 54 for the grid strips may be as shown in FIGS. 5A to 5D. The frame 54 comprises a base plate 55 provided, on its outer surface, with reinforcing ribs 61. Two of the ribs are provided to receive, at their ends, latching bushes 62 formed with a conical hole 63 (FIG. 5C) serving to receive pins belonging to the programmable unit.

It further comprises a removable plate 64 forming a cover. After the grid is positioned, plate 64 is fixed to the base plate 55 by captive nuts 65 located at the four corners of the frame. In the inner surface of the base plate 55 and in the removable plate 64 are formed two sets of parallel grooves 56. That one of these grooves which is closest to the middle plane of the frame (57 in FIG. 5C) is machined so as to permit the setting of a plate or strip of the grid which is in the vicinity of the center of the network. FIG. 5D shows spring blades 58 controlled by off center cams 59 for applying a thrust to the outer strips and positioning all strips with respect to the strip engaged in the groove 57.

The base plate 55 and the removable plate 64 are formed with holes 60 whose centers coincide with the intersections of the strips, thus permitting type A and type B welds to be carried out. The plate 64 includes in addition apertures 66 of sufficient cross-section to allow additional components to pass, such as lugs for welding the grid to guide tubes.

Holes 67 in the spring blades 58 enable type C welds to be carried out. Free passages 68 are defined by the ends of the spring blades 58 at each corner of the frame for type D welding.

The programmable unit 69 positioned in the welding chamber 29 is adapted to achieve several functions:
  taking up and deposition of a frame 54 containing a grid on the support 60 in the lock 28,
  successive presentation of the six surfaces of the grid in the chamber 29, The programmable unit 69 shown in FIGS. 6, 7 and 8 is designed to fulfil these functions. It is constituted by a cross motion table (FIG. 6) and a headstock 80 borne by the table (FIGS. 7 and 8).

The fixed part of the cross motion table is formed by a welded chassis 70 which rests on the bottom of the welding chamber 29. This structure is supported on ball-joints (not shown). These ball joints are retractable by means of excentrics. When they are retracted, the whole of the programmable unit rests on rails 53 (FIG. 2A) which make it possible to remove the unit for maintainance purpose.

The chassis 70 is provided with two guide rails (not shown in FIG. 6) over which a table 72 is slidably received for movements in a direction X. A control screw 71 in the direction X (FIG. 6) is retained in the chassis 70 by a block 73 and, in the door 50, by a block 74. The screw 71 is drivably connected to the shaft of an electric drive motor 76 located outside the enclosure. Motor 76 is borne by a plate 77 fixed to the door 50 by screws (not shown). The plate is thus removable to permit uncoupling the motor 76 from the rest of the programmable unit and removal of the latter over the rails 52 for maintainance. The table is provided with a ball circulation nut 75 mounted on the screw 71 whose length is sufficient to permit the table 72 to be brought up to the door 40 at the lock 28.

The table 72 carries two rails 78 directed along direction Y. The table 79 for Y movement is driven by a screw and ball-nut system similar to that which enables movements along X. The travel of the table 79 is such that each point of every surface of the grid to be welded may be brought into alignment with the electron beam.

The table 79 carries a headstock 80 (FIGS. 2A, 7 and 8) and its drive motors. The headstock 80 comprises a casing 100 in several assembled parts, fixed to the table 79, for example, by screws 101. To this casing is fixed an electric motor 102 of which the output shaft, parallel to the direction X, is coupled to a sleeve 103 rotatably mounted in bearings with cascaded sealing devices 104 borne by the casing. This sleeve bears a disk 105 provided with recesses at angular intervals of 45°, cooperating with a sensing push-rod 106 borne by the casing 100.

Sleeve 103 is provided to be removably fixed to a unit 81 for taking up one frame at a time and angularly by moving the latter around an axis perpendicular to that of the headstock. Referring to FIG. 8, unit 81 comprises a yoke 82 in which are mounted two rotary spindles defining the axis of orientation. The spindles 83 and 84 are adapted to seize the frame 54 equipped with the grid to be welded, indicated in mixed lines in FIG. 8. The spindles 83 and 84 comprise for this purpose a conical nose shaped for engagement into the rings 62. The frame is, in addition, held by an indexing pin or pins 85 fast to the spindle 84 and engaged in a housing of the frame 54.

To permit the seizing of a frame 54 and its deposition, the spindle 83 is connected by a linkage, having a lever 86 and a connecting rod to an electric motor 87. When energized, the motor 87 advances the spindle 83 into a bearing 88 to take up and clamp the frame 54. The clamping is therefore effected by the action of the spindle 83 and of the spindle 84 which then acts as a tailstock.

To permit the orientation of the frame, spindle 84 is controlled in rotation by an electric stepping motor 89 connected to a slide 90. The slide drives a connecting rod system 91 which rotates the spindle 84 guided in a block 92. The motor 89 is adapted to cause an angular movement of 90° of the frame 54. This movement cannot be less than 90° and, for this, the motor works in all or neithing mode.

The method according to the invention is carried out as follows in the apparatus which has just been described.

First of all, the strips 2, 5 of the grid to be welded are assembled and the grid is mounted in a frame 54, after the removable plate has been removed and the spring blades 58 retracted. Then the removable plate 64 is fixed and locked with nuts 65 and the strips are tightened against one another with the excentric cams 59. The strips then take up the correct position in the grooves 56, with respect to the central strip held in a reference position by the machined grooves 57.

The frame 54 bearing a grid is then placed on the support 36 in the lock 28. At the same time, a frame containing the grid which has just been welded can be extracted. The door of the lock is closed again. The lock 28 is evacuated. The following sequence of operations can be carried out automatically, for example by using a programmable unit.

The separating door 40 is first opened. The motor 76 comes into action to move the cross motion table, the headstock and the pick-up unit in direction X until the yoke 82, then in vertical position, straddles the loaded frame 54. In the course of this advance, the two spindles 83 and 84 are spaced apart. They are brought back together to seize the frame. Then the motor 76 is reactuated, in reverse direction from the preceding one, to bring back the frame into the welding chamber 24. The door 40 is closed. The welding chamber 29 is placed under vacuum. The welding operations proper are then carried out. Various sequences may be used to process successively all the surfaces and sides. It is possible, in particular:

- to rotate the headstock 80 by 90° by means of the motor 102 to present the base plate 55 beneath the electron beam generator,
- to move the frame 54 step by step along the axes X and Y by means of the motors of the double cross motion table so as to present successively beneath the beam each of the apertures 60 provided to produce a type A or type B weld on the first surface of the grid,
- to tilt the headstock 80 by 180° by means of the motor 102 so as to present the second surface of the grid and to carry out A and B welds on the second surface through the apertures 60 and 66 by repeating the preceding sequence,
- to tilt the frame 54 by 90° by means of the motor 89 acting on the spindle 84, to bring one of the side surfaces of the grid into a position perpendicular to the beam, and to move the frame step by step along the axes X and Y by means of the motors of the double cross motion table to carry out type C welds,
- to tilt the headstock 80 by 45° by means of the motor 102 so as to present a first passage 68 beneath the beam, then to form the type D weld seams of the first corner of the grid by movement along the direction Y,
- to tilt the headstock 80 by 45° to produce type C welds of the second side surface,
- to tilt the headstock 80 by 45° to permit the type D weld of a second corner,
- to repeat the two above operations to weld the two last side surfaces and the two last corners.

Once these operations have been carried out and the grid completely welded, the frame loaded with this grid must then be brought back into the lock and set down on the support. For this, the frame 54 is tilted by 90° by means of the motor 89, then the headstock 80 is tilted by 90° so that the frame is back again in vertical position. Separating door 40 is opened. The motor 76 for movement along X is actuated to bring the frame under the support 60 and the lock. Spindles 83 and 84 are separated to release the frame. The yoke is disengaged, then brought into engagement on the frame already placed manually on the support, in a position adjacent to the preceding one. The recharged frame is brought back into the welding chamber. Separating door is closed. The welding operations can then be repeated on the next grid. The lock can be brought bck to atmospheric pressure to permit the manual opening of the access door, the removal of the welded grid and the deposition of the frame bearing a further grid into the lock.

We claim:

1. Method of welding a grid comprising a belt and two sets of strips whose end portions are fastened to said belt, comprising the steps of: placing said grid in a holding frame having passages for access to spots to be welded on two larger surfaces and on four sides of the grid; seizing said frame containing said grid with an orientation device for angular movement, supporting said orientation device with a cross motion table for movements in directions perpendicular to a line of welding radiation and moving said device to cause each spot to be welded on a surface of said grid to pass through said line of welding radiation and energizing said welding radiation; repeating the movement and energization sequences after the frame has been tilted by 90° around a first axis perpendicular to the line of welding radiation by means of said orientation device, in order to produce welds on all of the two surfaces and on two of said sides of said grid; and repeating the movement and energization sequences after the frame has been moved into two opposite orientations successively by tilting around a second axis at right angles to the first, in order to produce weldson the two last sides, and depositing the frame.

2. Method according to claim 1, wherein welding is carried out by electron beam welding in an evacuated chamber.

3. Method according to claim 2, wherein welding is carried out whilst the grid is in movement.

4. Method according to claim 3, wherein the radiation beam is deflected during welding in such a direction as to follow the movement of the frame whereby the welding time for each spot is increased.

5. Method according to claim 4, wherein corner welds are produced between strips constituting the belt, after the frame has been tilted into orientations around one of the first and the second axes at 45° from those used for producing the welds on the sides.

6. Apparatus for welding grids constituted by at least two intersecting sets of parallel strips arranged at angles and of which the teminal portions are fast to a belt, comprising: an enclosure with controlled atmosphere provided with a lock; an orientation device in said enclosure, capable of bringing each of two surfaces and each of four sides of the grid in turn into an orientation perpendicular to the firing line of a radiation welding unit; a cross motion table in said enclosure for carrying said orientation device and moving the frame in two directions perpendicular to the firing line, so as to bring each spot to be welded in turn along the firing line, said orientation device and the table being provided with control motors and constituting a unit for presenting all the welding spots to be carried out in succession opposite the firing line and said orientation device comprising a headstock enabling a yoke to be oriented around an axis parallel to one of the axes of movement of the table, said yoke being provided with means for seizing the frame and rotating the latter around a second axis, parallel to the other direction of movement of the table.

7. Apparatus according to claim 6, wherein the radiation welding unit is an electron beam generator.

8. Apparatus according to claim 6, wherein the yoke bears a motor enabling the spindles to be moved along their axis of alignment between a closed position for seizing a frame and a spaced position for releasing the frame, one at least of the spindles being in addition provided with rotary drive means.

9. Apparatus according to claim 6, wherein each frame comprises a base plate and a removable closure plate provided with grooves for receiving strips, one of the grooves being placed close to the center and adapted to retain the corresponding strip in a reference position, whilst the other grooves leave a free movement to the strips that they receive, the frame comprising in addition elastic means enabling each set of strips to be pressed towards the centre of the frame and to fix their position with respect to the reference strip.

10. Apparatus according to claim 6, wherein the enclosure defining the welding chamber as well as a door for closing the welding chamber are provided with rails, the rails of the door being provided to be aligned with those of the chamber when the door is open in order to permit extraction of the double cross movement table.

11. Method of welding a grid comprising a belt having four sides and two sets of mutually orthogonal strips whose end portions are fastened to said belt, comprising the steps of: clamping said grid in a holding frame having passages for access to all spots to be welded on two larger surfaces and on the four sides of the grid; locating said frame containing said grid with an orientation device for angular movement about two mutually orthogonal axes; supporting said orientation device with a cross motion table for movements in two mutually orthogonal directions perpendicular to a line of welding radiation; moving said device linearly to cause each spot to be welded on a surface of said grid to pass through said line of welding radiation while energizing said welding radiation; repeating the movement and energization sequences after the frame has been tilted by 90° around a first of said mutually orthogonal axes which is perpendicular to the line of welding radiation by means of said orientation device, in order to produce welds on all of the two surfaces and on two of said sides; repeating the movement and energization sequences after the frame has been moved into two opposite orientations successively by tilting around the second of said axes in order to produce welds on the last two sides; and depositing the frame.

* * * * *